United States Patent
Kim et al.

(10) Patent No.: US 12,087,510 B2
(45) Date of Patent: Sep. 10, 2024

(54) MULTILAYER CAPACITOR

(71) Applicant: SAMSUNG ELECTRO-MECHANICS CO., LTD., Suwon-si (KR)

(72) Inventors: Hwi Dae Kim, Suwon-si (KR); Won Chul Sim, Suwon-si (KR); Taek Jung Lee, Suwon-si (KR); Jin O Yoo, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 129 days.

(21) Appl. No.: 17/840,000

(22) Filed: Jun. 14, 2022

(65) Prior Publication Data

US 2023/0091278 A1     Mar. 23, 2023

(30) Foreign Application Priority Data

Sep. 15, 2021    (KR) .................... 10-2021-0122914

(51) Int. Cl.
*H01G 4/30*      (2006.01)
*C04B 35/468*      (2006.01)
(Continued)

(52) U.S. Cl.
CPC ............ *H01G 4/30* (2013.01); *C04B 35/468* (2013.01); *C04B 35/64* (2013.01); *H01G 4/008* (2013.01);
(Continued)

(58) Field of Classification Search
CPC ...... H01G 4/008; H01G 4/012; H01G 4/1227; H01G 4/232; H01G 4/30; C04B 35/468; C04B 35/64; C04B 2235/3206
See application file for complete search history.

(56) References Cited

U.S. PATENT DOCUMENTS

| 2015/0041199 A1 | 2/2015 | Lee et al. | |
| 2015/0083475 A1* | 3/2015 | Kim | H01G 2/06 29/25.42 |

(Continued)

FOREIGN PATENT DOCUMENTS

| JP | 2018-46131 A | 3/2018 |
| JP | 6309313 B2 | 3/2018 |

(Continued)

*Primary Examiner* — Nathan Milakovich
(74) *Attorney, Agent, or Firm* — Morgan, Lewis & Bockius LLP

(57) ABSTRACT

A multilayer capacitor includes a body including a dielectric layer and first and second internal electrodes stacked on each other and having the dielectric layer interposed therebetween; a pair of first external electrodes respectively disposed on first and second corners of the body, which are not adjacent to each other, and connected to the first internal electrode; a pair of second external electrodes respectively disposed on third and fourth corners of the body, which are not adjacent to each other, and connected to the second internal electrode; and a reinforcing portion disposed on a surface of the body, not covered by at least one of the first and second external electrodes, and including a sintered ceramic body.

20 Claims, 9 Drawing Sheets

(51) Int. Cl.
    *C04B 35/64*     (2006.01)
    *H01G 4/008*     (2006.01)
    *H01G 4/012*     (2006.01)
    *H01G 4/12*     (2006.01)
    *H01G 4/232*     (2006.01)

(52) U.S. Cl.
    CPC ........... *H01G 4/012* (2013.01); *H01G 4/1227* (2013.01); *H01G 4/232* (2013.01); *C04B 2235/3206* (2013.01)

(56) References Cited

U.S. PATENT DOCUMENTS

| | | |
|---|---|---|
| 2018/0075970 A1 | 3/2018 | Sato et al. |
| 2019/0027312 A1* | 1/2019 | Muramatsu ............... H01G 4/12 |
| 2020/0152382 A1* | 5/2020 | Sakurai .................. H01G 4/248 |
| 2020/0381180 A1 | 12/2020 | Lee et al. |
| 2022/0139616 A1* | 5/2022 | Kang ................... H01G 4/2325 |
| | | 361/301.4 |

FOREIGN PATENT DOCUMENTS

| | | |
|---|---|---|
| KR | 10-2077617 B1 | 2/2020 |
| KR | 10-2254876 B1 | 5/2021 |

\* cited by examiner

B-B'

MULTILAYER CAPACITOR

CROSS-REFERENCE TO RELATED APPLICATION(S)

This application claims benefit of priority to Korean Patent Application No. 10-2021-0122914 filed on Sep. 15, 2021 in the Korean Intellectual Property Office, the disclosure of which is incorporated herein by reference in its entirety.

TECHNICAL FIELD

The present disclosure relates to a multilayer capacitor.

BACKGROUND

A capacitor is a device which may store electricity, and uses a principle that the electricity is generally accumulated in each of two electrodes of the capacitor when a voltage is applied to the capacitor in a state in which the two electrodes are disposed opposite to each other. In a case where a direct current (DC) voltage is applied to the capacitor, a current flows in the capacitor while the electricity is accumulated in the capacitor. However, the current does not flow in the capacitor when the accumulation of the electricity is completed. Meanwhile, in a case where an alternating current (AC) voltage is applied to the capacitor, an AC current flows in the capacitor while polarities of the electrodes are alternated with each other.

The capacitor may be classified as one of several types based on a type of an insulator positioned between the electrodes such as an aluminum electrolytic capacitor in which the electrodes are made of aluminum and a thin oxide film is disposed between these aluminum electrodes, a tantalum capacitor in which tantalum is used as an electrode material, a ceramic capacitor in which a dielectric material of a high dielectric constant such as a barium titanate is positioned between the electrodes, a multilayer ceramic capacitor (MLCC) in which ceramic of a high dielectric constant, formed in a multilayer structure, is used as a dielectric material positioned between the electrodes, a film capacitor in which a polystyrene film is used as a dielectric material positioned between the electrodes, etc.

Among such capacitors, the multilayer ceramic capacitor has excellent temperature and frequency characteristics and may be implemented in a small size, and has thus been recently used widely in various fields such as a high frequency circuit. In recent years, there have been continuous efforts to make the multilayer ceramic capacitor smaller, and the dielectric layer and the internal electrodes are made thinner to this end.

In accordance with an increasing demand in recent years for reducing a thickness of an electronic component, researches have been continuously conducted to reduce the thickness of the multilayer ceramic capacitor. However, when having a smaller thickness, the multilayer ceramic capacitor may have difficulty in sufficiently securing rigidity. Therefore, there may be an increased probability that a defect may occur while the capacitor is mounted on a board, etc.

SUMMARY

An aspect of the present disclosure may provide a multilayer capacitor having improved rigidity characteristics.

Another aspect of the present disclosure may provide a multilayer capacitor including an external electrode having improved structural stability.

According to an aspect of the present disclosure, a multilayer capacitor may include: a body including a dielectric layer and first and second internal electrodes stacked on each other and having the dielectric layer interposed therebetween; a pair of first external electrodes respectively disposed on first and second corners of the body, which are not adjacent to each other, and connected to the first internal electrode; a pair of second external electrodes respectively disposed on third and fourth corners of the body, which are not adjacent to each other, and connected to the second internal electrode; and a reinforcing portion disposed on a surface of the body, not covered by at least one of the first and second external electrodes, and including a sintered ceramic body.

The sintered ceramic body may include a ceramic component other than a ceramic component included in the dielectric layer.

The dielectric layer may include a barium-titanate component, and the sintered ceramic body may include an alumina component.

A region of the body, in contact with the reinforcing portion, may include the component included in the sintered ceramic body.

The region of the body, in contact with the reinforcing portion, may include a sintering aid component included in the sintered ceramic body.

The sintering aid component may include a magnesium oxide (MgO).

A region of the reinforcing portion, in contact with the body, may include the component included in the region of the body, in contact with the reinforcing portion.

When a thickness is defined based on a length of the capacitor, measured in a direction in which the first and second internal electrodes are stacked on each other, a thickness t1 and a thickness t2 may satisfy a condition of $0 \le (t1-t2)/t1 < 1/3$, in which t1 indicates a thickness of the first or second external electrode, measured from the surface of the body where the reinforcing portion is positioned, and t2 indicates a thickness of the reinforcing portion.

The first and second external electrodes may be respectively disposed on first and second surfaces of the body, opposite to each other in a direction in which the first and second internal electrodes are stacked on each other, and may extend to partially cover a side surface of the body.

The first and second external electrodes may each include a seed layer disposed on at least one of the first and second surfaces, and a plating layer covering the seed layer.

The plating layer may cover the first or second surface, and may extend to partially cover the side surface of the body.

The first and second internal electrodes may extend from the side surface of the body that is not covered by the seed layer.

The body may have a square structure based on a direction in which the first and second internal electrodes are stacked on each other.

A length of one side may have a value between −10% and +10% of $(250+n*350)\mu m$, based on the direction in which the first and second internal electrodes are stacked on each other, and here "n" is a natural number.

The multilayer capacitor may have a thickness of 70 μm or less when the thickness is defined based on its length measured in the direction in which the first and second internal electrodes are stacked on each other.

According to another aspect of the present disclosure, a multilayer capacitor may include: a body including a dielectric layer and first and second internal electrodes stacked on each other and having the dielectric layer interposed therebetween; first and second external electrodes each covering a side surface of the body and respectively connected to the first and second internal electrodes, and extending only to a second surface of the body opposite a first surface of the body based on a direction in which the first and second internal electrodes are stacked on each other; and a reinforcing portion disposed on at least the second surface of the body, not covered by the first or second external electrode, and including a sintered ceramic body.

The reinforcing portion may be disposed only on the second surface of the body.

The reinforcing portion may be disposed on both the first and second surfaces of the body.

The first surface of the body may be exposed.

The reinforcing portion may overlay an entirety of the first surface of the body based on the direction in which the first and second internal electrodes are stacked on each other.

BRIEF DESCRIPTION OF DRAWINGS

The above and other aspects, features and advantages of the present disclosure will be more clearly understood from the following detailed description taken in conjunction with the accompanying drawings, in which.

Figure 1:
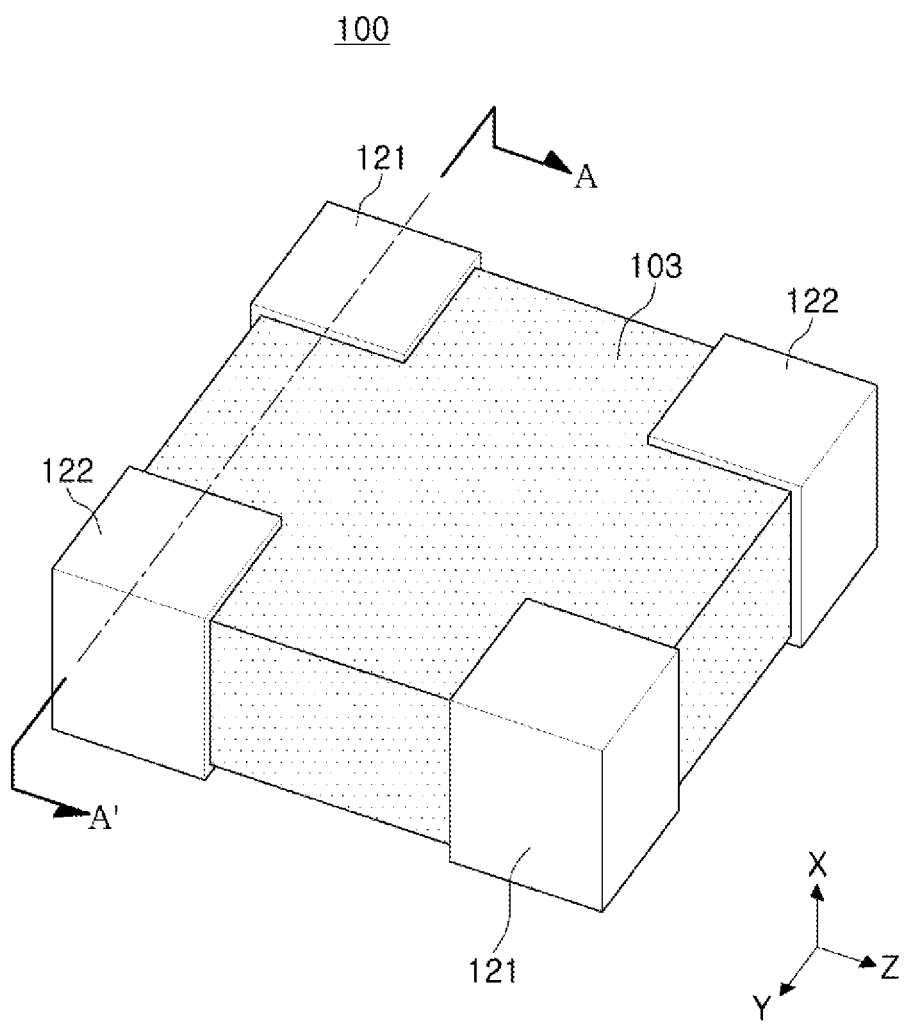
FIG. 1 is a perspective view schematically showing an appearance of a multilayer capacitor according to an exemplary embodiment of the present disclosure.
Figure 10:
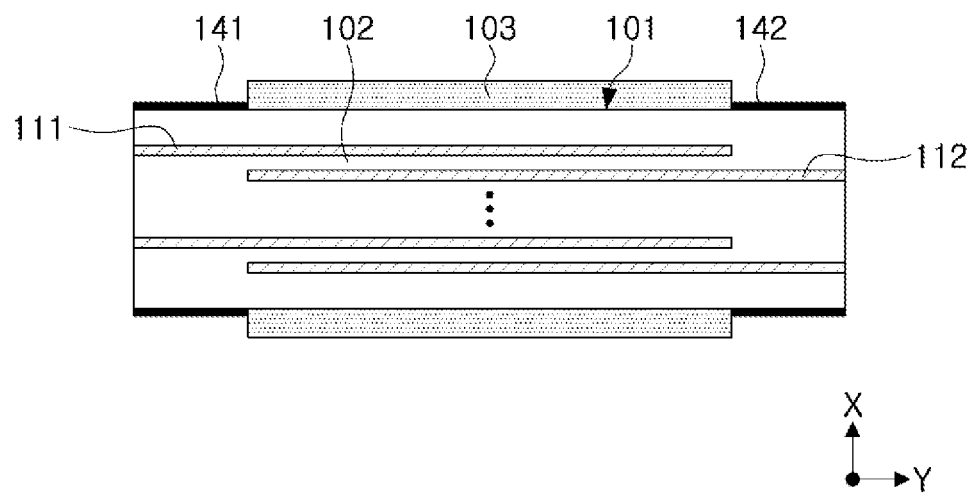
Figure 11:
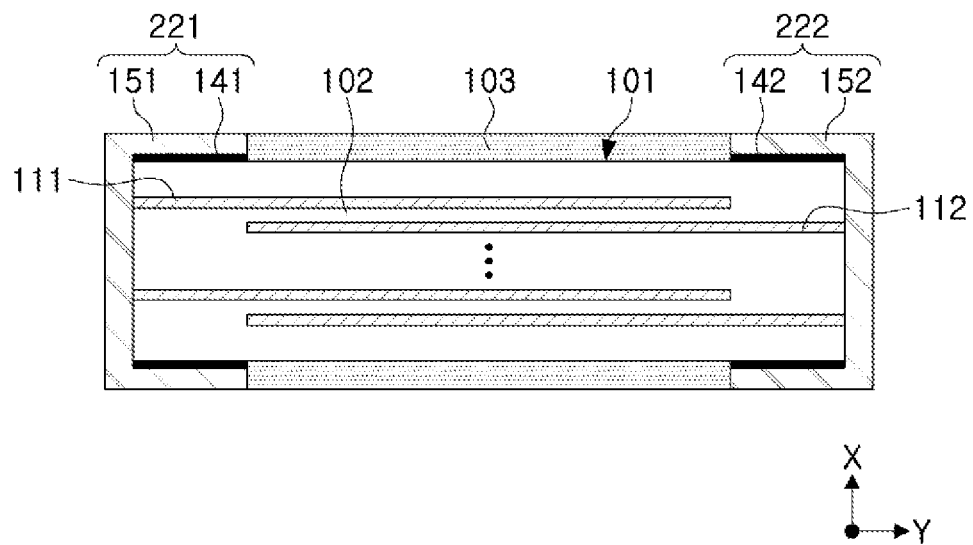
Figure 12:
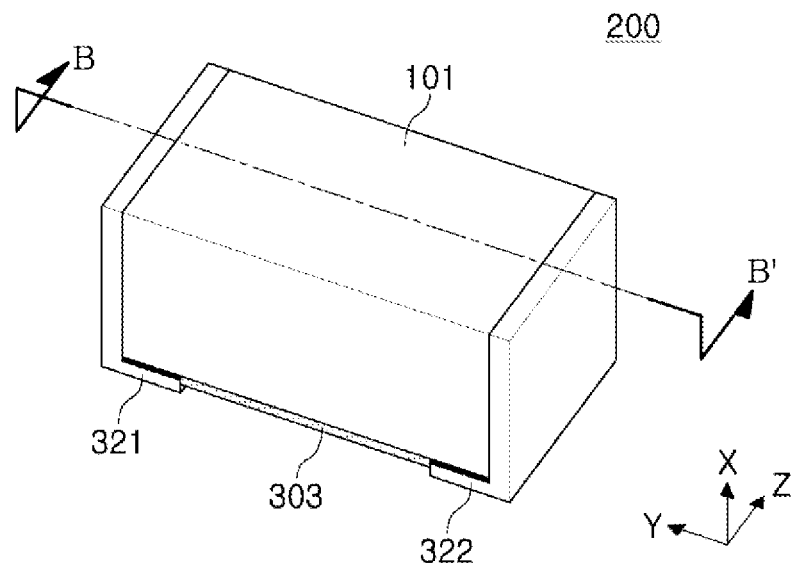
Figure 13:
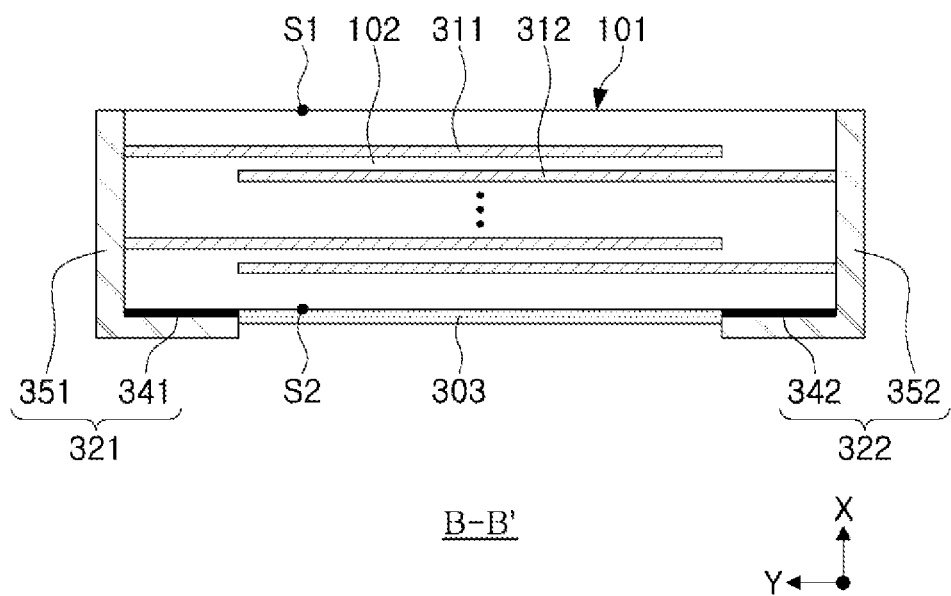
Figure 14:
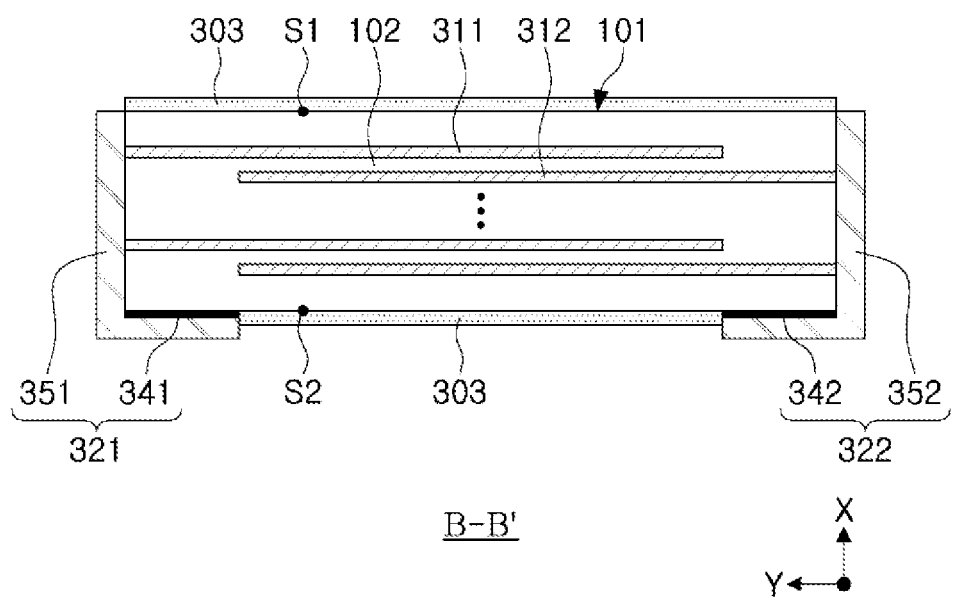

Each of FIGS. 2 through 6 is a cross-sectional view of the multilayer capacitor of FIG. 1;

FIGS. 7 through 11 are views each showing an example of a process of manufacturing the multilayer capacitor according to an exemplary embodiment of the present disclosure; and FIGS. 12 through 14 each show a multilayer capacitor according to another exemplary embodiment of the present disclosure.

DETAILED DESCRIPTION

Hereinafter, exemplary embodiments of the present disclosure will now be described in detail with reference to the accompanying drawings.

FIG. 1 is a perspective view schematically showing an appearance of a multilayer capacitor according to an exemplary embodiment of the present disclosure; and each of FIGS. 2 through 6 is a cross-sectional view of the multilayer capacitor of FIG. 1.

Referring to FIGS. 1 through 4, a multilayer capacitor 100 according to an exemplary embodiment of the present disclosure includes a body 101 including a dielectric layer 102 and first and second internal electrodes 111 and 112 stacked on each other and having the dielectric layer interposed therebetween, first and second external electrodes 121 and 122, and a reinforcing portion 103 disposed on a surface of the body 101.

Figure 2:
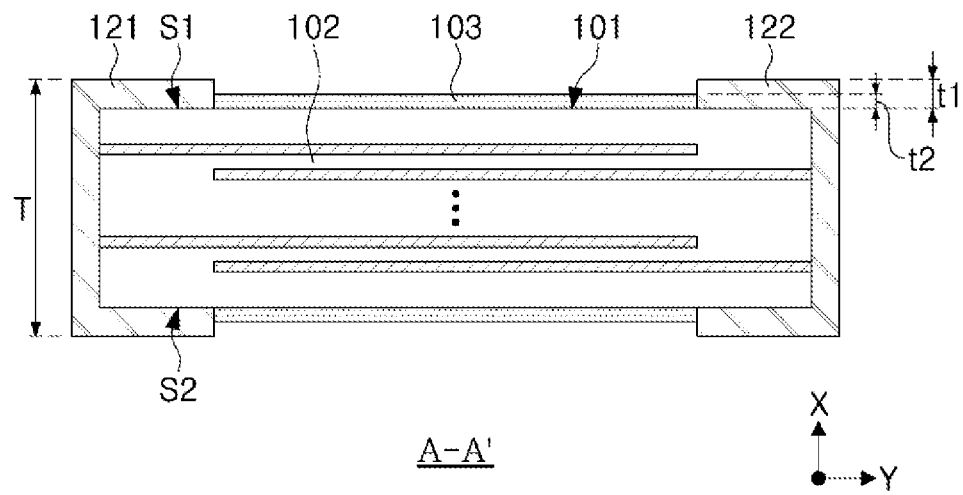
Figure 3:
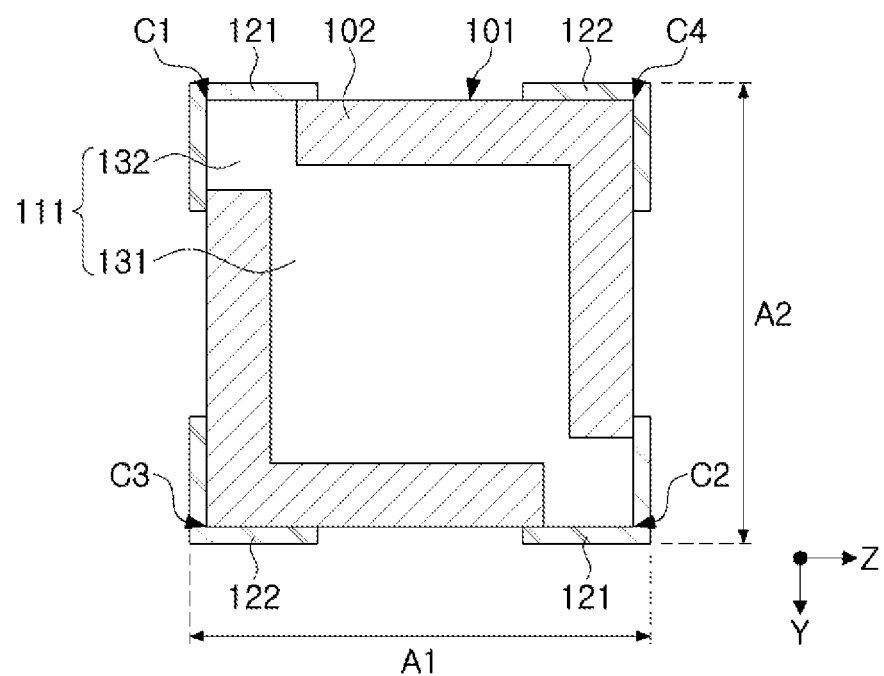

The body 101 may include the dielectric layer 102, and may be obtained by stacking a plurality of green sheets on each other and then sintering the same for example. The plurality of dielectric layers 102 may have an integrated shape by this sintering process. In addition, as shown in FIGS. 2 through 4, the body 101 may have a square structure based on a direction (X direction) in which the first and second internal electrodes 111 and 112 are stacked on each other.

The dielectric layer 102 included in the body 101 may include a ceramic material having a high dielectric constant, barium titanate ($BaTiO_3$) based ceramics for example, and may also include any other material known in the art as long as the capacitor obtains sufficient capacitance. The dielectric layer 102 may further contain an additive, an organic solvent, a plasticizer, a binder, a dispersant and the like, if necessary, in addition to the ceramic material which is a main component. Here, when using the additive, the dielectric layer may include the additive in the form of a metal oxide during its manufacturing process. The metal oxide additive may include, for example, at least one of manganese dioxide ($MnO_2$), dysprosium oxide ($Dy_2O_3$), barium oxide (BaO), magnesium oxide (MgO), aluminium oxide ($Al_2O_3$), silicon dioxide ($SiO_2$), chromium(III) oxide ($Cr_2O_3$) and calcium carbonate ($CaCO_3$).

The first and second internal electrodes 111 and 112 may be disposed in the body 101, and these internal electrodes may be obtained, for example, by printing a paste, which includes a conductive metal having a predetermined thickness, on one surface of a ceramic green sheet and then firing the same. A main constituent material included in the first and second internal electrodes 111 and 112 may be copper (Cu), nickel (Ni), silver (Ag), palladium (Pd) or the like, and may also be an alloy thereof. Referring to FIG. 3, the first internal electrode 111 may be connected to the pair of first external electrodes, and include a first main portion 131 and a first lead portion 132. The first lead portion 132 may be connected to the first external electrode 121 by being extended in a diagonal direction in which each of first and second corners C1 and C2 of the body 101 and the first main portion 131 are connected to each other.

Figure 4:
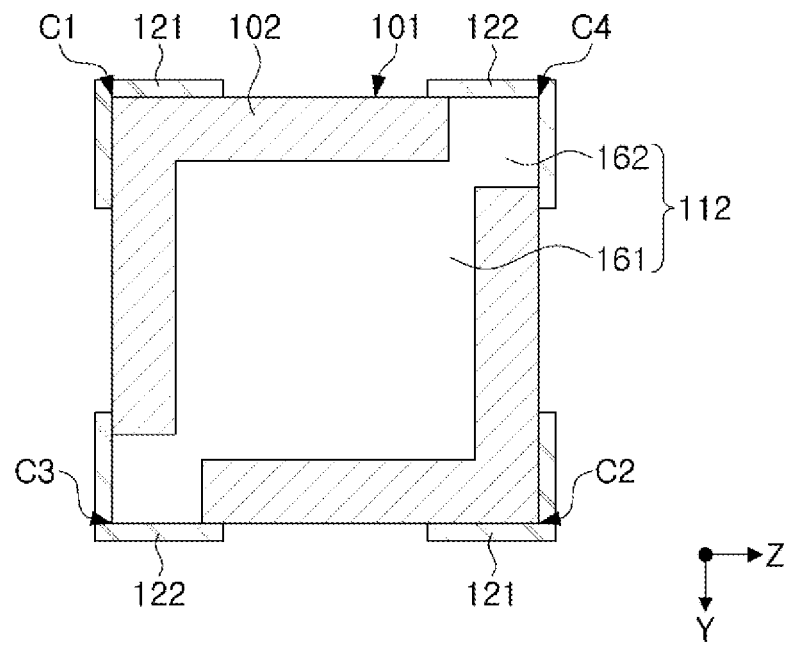

Referring to FIG. 4, the second internal electrode 112 may be connected to the pair of second external electrodes 122, and include a second main portion 161 and a second lead portion 162. The second lead portion 162 may be connected to the second external electrode 122 by being extended in a diagonal direction in which each one of third and fourth corners C3 and C4 of the body 101 and the second main portion 161 are connected to each other.

The pair of first external electrodes may be respectively disposed on the first and second corners C1 and C2 of the body 101, which are not adjacent to each other, and may be connected to the first internal electrode 111. Similarly, the pair of second external electrodes may be respectively disposed on the third and fourth corners C3 and C4 of the body 101, which are not adjacent to each other, and may be connected to the second internal electrode 112. As shown in FIG. 2, first and second external electrodes 121 and 122 may be respectively disposed on first and second surfaces S1 and S2 of the body 101, opposite to each other in the direction (X direction) in which the first and second internal electrodes 111 and 112 are stacked on each other, and extended to partially cover a side surface of the body 101.

The first and second external electrodes 121 and 122 may each be made of any material having electrical conductivity, such as a metal, use a specific material determined in consideration of electrical characteristics, structural stability or the like, and have a multilayer structure. For example, the first and second external electrodes 121 and 122 may each be a fired electrode including the conductive metal and glass, and may further include a plating layer covering the first and second external electrodes 121 and 122. The conductive metals which may be included in this fired electrode may be, for example, one or more of nickel (Ni), copper (Cu) and an alloy thereof. In addition, the plating layer may serve to improve mount characteristics of the external electrode, may include at least one of Ni, tin (Sn), Pd and an alloy thereof, and may include a plurality of layers. However, as in an exemplary embodiment described below, the first and second external electrodes 121 and 122 may each include a seed layer and the plating layer. In this case, the first and second external electrodes 121 and 122 may each be thin and uniform.

When having a four-terminal structure as in this exemplary embodiment, the multilayer capacitor 100 may maintain high rigidity even when having a small thickness. There still remains a limit in securing rigidity characteristics of the multilayer capacitor 100 due to an increasing demand for its smaller thickness. Here, a thickness T of the multilayer capacitor 100 may be defined based on a length of the first or second internal electrode 111 or 112, measured in the direction (X direction) in which the first and second internal electrodes 111 and 112 are stacked on each other, and the multilayer capacitor 100 may have a thickness of about 70 μm or less. In addition, an equivalent series inductance (ESL) may be reduced as the external electrodes 121 and 122 having different polarities are alternately disposed at the corners C1, C2, C3 and C4 of the body 101.

The reinforcing portion 103 may be disposed in a region, not covered by the first or second external electrode 121 or 122, on the surface of the body 101, and may include a sintered ceramic body. The reinforcing portion 103 may cover the first and second surfaces S1 and S2 of the body 101, and simultaneously, may also cover the side surface of the body 101. In this exemplary embodiment, the reinforcing portion 103 may cover the entire region, not covered by the first and second external electrodes 121 and 122, on the surface of the body 101. However, some regions may be transformed into uncovered structures as long as the regions may function as the reinforcing portions 103. As described above, the multilayer capacitor 100 having the four-terminal structure may have reduced rigidity characteristics when having a small thickness (e.g., 70 μm or less). However, when the reinforcing portion 103 is used, the body 101 may have an increased thickness and, the multilayer capacitor 100 may thus have improved rigidity characteristics. In addition, the reinforcing portion 103 may reduce a height difference between the body 101 and the external electrodes 121 and 122, thus preventing a problem that may occur due to the height difference, for example, a component tilted, peeled-off electrode, etc.

The reinforcing portion 103 may include the sintered ceramic body. When the reinforcing portion 103 includes the sintered ceramic body, the reinforcing portion 103 and the dielectric layer 102 may be sintered together in a single sintering process. In this case, the reinforcing portion 103 may have an improved bonding force with the body 101, structural stability and the like than a case of including a component such as a resin rather than being the sintered ceramic body. The sintered ceramic body included in the reinforcing portion 103 may include a ceramic component other than the ceramic component included in the dielectric layer 102. For example, the sintered ceramic body may include another ceramic component having superior rigidity characteristics than the ceramic component included in the dielectric layer 102. In more detail, the dielectric layer 102 may include the barium-titanate component, and the sintered ceramic body may include an alumina component. When the ceramic component of the dielectric layer 102 and that of the reinforcing portion 103 include the components different from each other, these ceramic components may have sintering temperatures different from each other. For example, the alumina component may be sintered at a higher temperature than the barium-titanate component. The reinforcing portion 103 may include a sintering aid component so that both the ceramic components of the dielectric layer 102 and the reinforcing portion 103 may be sintered at temperatures similar to each other, and the sintering aid component may include a metal oxide such as magnesium oxide (MgO). In addition, during the sintering process, the component included in the sintered ceramic body of the reinforcing portion 103, including the sintering aid component, may be diffused toward the body 101. Accordingly, a region of the body 101, in contact with the reinforcing portion 103, may include the component included in the sintered ceramic body. Similarly, the component included in the body 101 may also be diffused into the reinforcing portion 103, and a region of the reinforcing portion 103, in contact with the body 101, may include the component included in the region of the body 101, in contact with the reinforcing portion 103.

Figure 6:
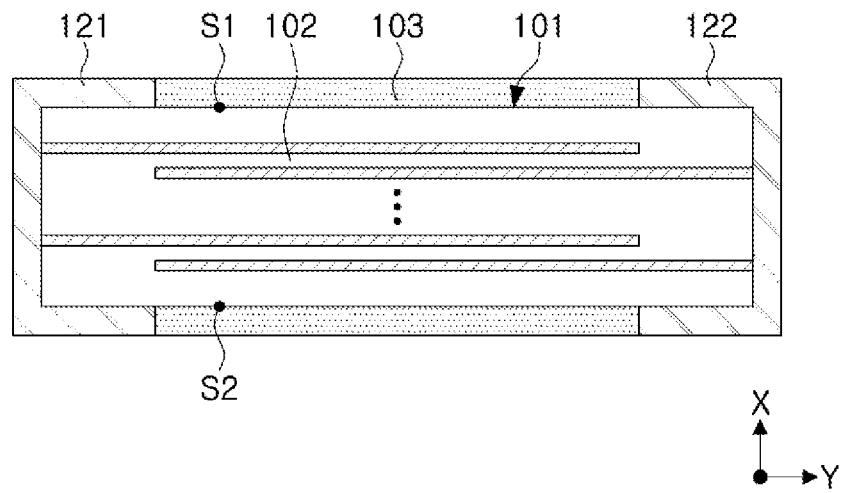

A thickness t2 of the reinforcing portion 103 may be determined in consideration of the above-described rigidity characteristics, height-difference reduction function, etc. In this exemplary embodiment, when the thickness is defined based on a length of the capacitor, measured in the direction (i.e. X direction) in which the first and second internal electrodes 111 and 112 are stacked on each other, a thickness t1 and the thickness t2 may satisfy a condition of $0 \leq (t1-t2)/t1 < 1/3$, in which t1 indicates a thickness of the first or second external electrode 121 or 122, measured from the surface of the body 101 where the reinforcing portion 103 is positioned, and t2 indicates the thickness of the reinforcing portion 103. When the reinforcing portion 103 is thicker than the external electrode 121 or 122 (i.e., t1<t2), the thickness T of the multilayer capacitor 100 may be increased due to the reinforcing portion 103. When being thinner than the external electrode 121 or 122, the reinforcing portion 103 may have a lower limit value of $(t1-t2)/t1 < 1/3$. When the reinforcing portion 103 is excessively thin and has a value of $(t1-t2)/t1$ greater than or equal to 1/3, the height difference between the reinforcing portion 103 and the external electrode 121 or 122 may be increased, and accordingly, the rigidity characteristics or structural stability of the electrode may not be sufficiently secured. The exemplary embodiment of FIG. 2 shows a case of t1>t2. However, as included in the above condition, t1 and t2 may be the same, that is, the reinforcing portion 103 and the external electrode 121 or 122 may have the same thickness as each other, which is the same as shown in FIG. 6. As an example of a method of measuring the thicknesses of the reinforcing portion 103 and the external electrode 121 or 122, it is possible to measure the thicknesses of the reinforcing portion 103 and the external electrode 121 or 122 at a plurality of points (e.g., 5 points or more) spaced apart from each other at equal intervals in one cross section of the multilayer capacitor 100 and then calculate an average value thereof. In addition, it is also possible to perform the calculation for the plurality of cross-sections of the multilayer capacitor 100.

Table 1 below summarizes test results of the rigidity and of whether the component is peeled-off based on a condition of the thicknesses of the reinforcing portion and the external electrode. An example that does not satisfy a criteria presented in the above-described exemplary embodiment of the present disclosure is marked with a*. Here, the rigidity has a value obtained from a result of simulating a relative rigidity by setting 1 as a rigidity of a case where t2=0 (indicated as Example 1), which is the case where the capacitor does not include the reinforcing portion. For example, in the simulation, a load may be applied to a center of the sample, and the deflection may be measured. A larger deflection may correspond to a lower relative rigidity. In the test of whether the component is peeled-off, mark "O" (when not peeled-off) or "X" (when peeled-off) indicates whether the external electrode is peeled-off or not when a cleaning solution is sprayed on the component to remove residues such as flux, and here an injection pressure is adjusted at a level of 40 to 120 Psi. For example, the nozzle from which the cleaning solution may be sprayed may be arranged at an acute angle (e.g., 30°) relative to a surface of the multilayer capacitor body. The peeling of the component may be observed visually or by a microscope.

TABLE 1

| Ex. | (t1 − t2)/t1 | Relative rigidity | Peeled-off |
|---|---|---|---|
| 1* | 1 | 1.00 | X |
| 2* | 0.75 | 1.18 | X |
| 3* | 0.5 | 1.39 | X |
| 4 | 0.25 | 1.59 | O |
| 5 | 0 | 1.81 | O |
| 6* | −0.25 | 2.05 | O |
| 7* | −0.5 | 2.32 | X |
| 8* | −0.75 | 2.62 | X |
| 9* | −1 | 2.91 | X |

Example 1 not including the reinforcing portion has a relatively low rigidity and thus fails the peel-off test. Each of Examples 2 and 3 has a thickness vale of (t1−t2)/t1>1/3, and thus fails to secure a sufficient thickness of the reinforcing portion. Therefore, Examples 2 and 3 have relatively low rigidity characteristics and fail the peel-off test. In addition, Examples 6 to 9 show that the reinforcing portion has excellent rigidity characteristics as being thicker. However, in these Examples, the component has the increased thickness, which is not appropriate for the multilayer capacitor required to have the small thickness. In particular, Examples 7 to 9 show an excessively large difference in thicknesses of the reinforcing portion and the external electrode, and also show a poor test result of whether the component is peeled-off. In comparison, Examples 4 and 5 in which the reinforcing portion has a thickness of an appropriate level (satisfying the condition of 0≤(t1−t2)/t1<1/3) secure both the rigidity characteristics and structural stability of the electrode without increasing the thickness of the part.

Meanwhile, as described above, the body 101 may have the square structure based on the direction (X direction) in which the first and second internal electrodes 111 and 112 are stacked on each other, and accordingly, the multilayer capacitor 100 may also have an overall shape similar to the square. For example, the multilayer capacitor 100 may have a size in which a length of a side A1 or A2 is (250+n*350) μm, based on the X direction, where "n" may be a natural number. For example, when "n" is 1, the multilayer capacitor 100 has a size of 600 μm*600 μm. However, when considering an error range, the length of the one side A1 or A2 may have a value between −10% and +10% of (250+n*350)μm. Here, the length of the one side may be a multiple of 350 μm in consideration of a pitch value of a solder ball and the like when the multilayer capacitor 100 is mounted on the board. In addition, the thickness T of the multilayer capacitor 100 may be as small as 70 μm or less, based on its length measured in the X direction. Meanwhile, the thickness T and length of the one side A1 or A2 of the multilayer capacitor 100 may indicate a maximum value among values measured in a plurality of regions, or may be a value obtained by averaging the plurality of values. The thicknesses disclosed herein, including T, t1, and t2, and the length of the one side A1 or A2 may be measured by, for example, an optical microscope or a scanning electron microscope (SEM).

Figure 5:
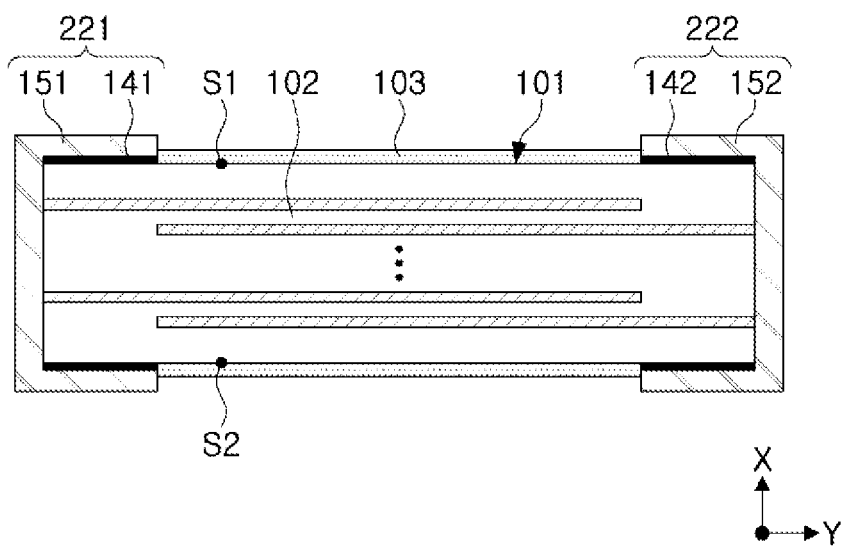

A modified example of an exemplary embodiment of the present disclosure is described with reference to FIG. 5. FIG. 5 shows the example in which a shape of the external electrode is modified from that of an exemplary embodiment, and the description thus omits detailed descriptions of the other same components. First and second external electrodes 221 and 222 may include seed layers 141 and 142 and plating layers 151 and 152, respectively. The seed layer 141 or 142 may be disposed on at least one of the first and second surfaces S1 and S2 of the body 101, and in this exemplary embodiment, the seed layer 141 or 142 may be disposed on both the first and second surfaces S1 and S2 of the body 101. The seed layers 141 and 142 may serve as seeds for respectively forming the plating layers 151 and 152, and may each be formed by, for example, applying a nickel (Ni) layer to the surface of the body 101. The plating layer 151 or 152 may cover the first and second surfaces S1 and S2 of the body 101, and may be extended to partially cover the side surface of the body 101. The plating layer 151 or 152 may include copper (Cu), nickel (Ni) or the like. In this case, the seed layer 141 or 142 may not cover the side surface of the body 101, where the first or second internal electrode 111 or 112 is exposed, and each region of the plating layers 151 and 152, which contacts and covers the side surface of the body 101, may be formed by using the first or second internal electrode 111 or 112 as its seed.

Meanwhile, FIG. 5 shows the example in which the reinforcing portion 103 is made thinner than the external electrode 221 or 222. However, the reinforcing portion 103 and the external electrode 221 or 222 may have the same thickness as each other, which is the same as shown in FIG. 11. As shown in exemplary embodiments of FIGS. 5 and 11, the first and second external electrodes 221 and 222 may be formed as the plating layer, thereby making the electrode thin and uniform, which may be advantageous for making multilayer capacitor 100 thinner.

Figure 7:
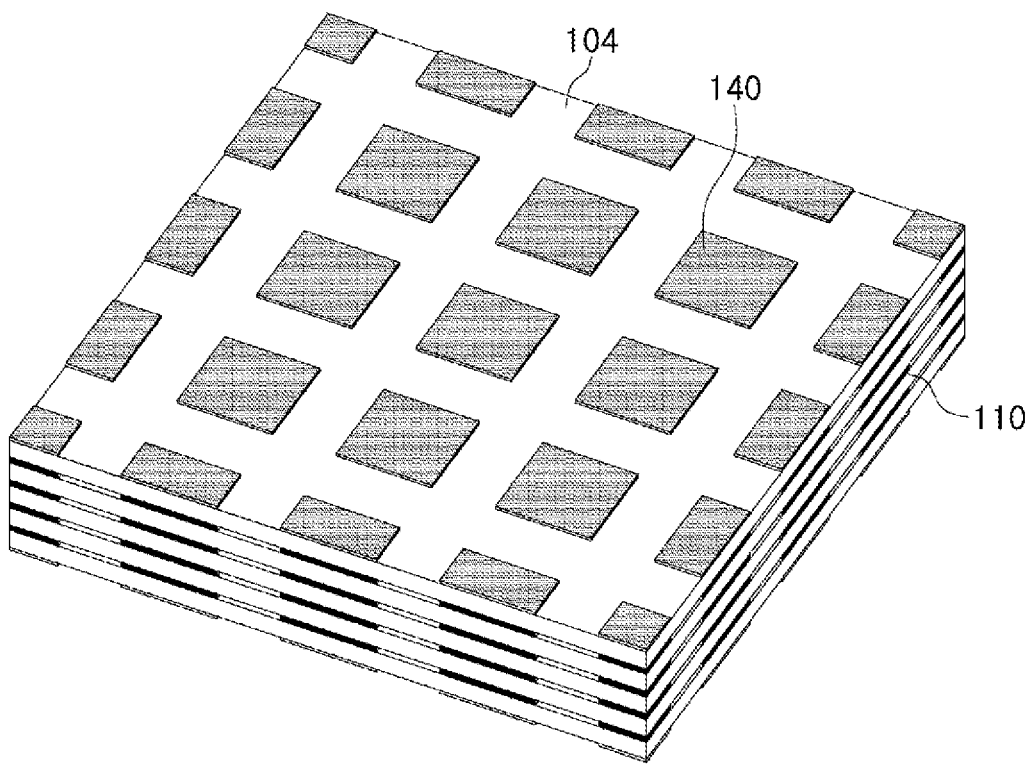
Figure 8:
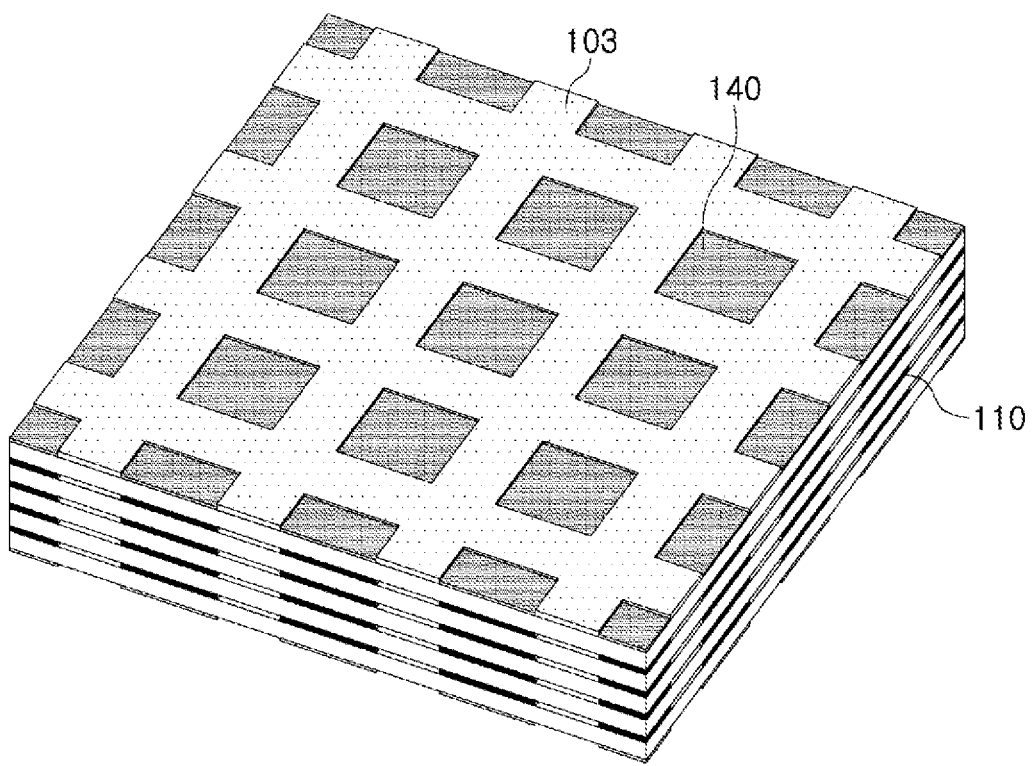
Figure 9:
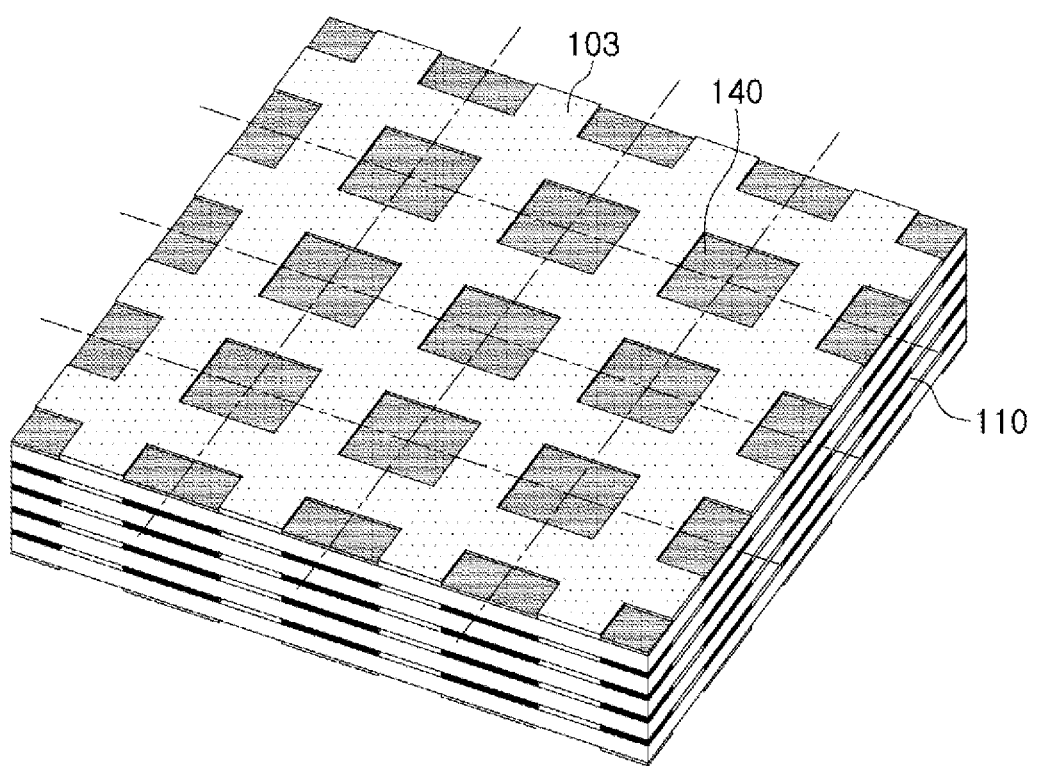

FIGS. 7 through 11 are views each showing an example of a process of manufacturing the multilayer capacitor according to an exemplary embodiment of the present disclosure. First, as shown in FIG. 7, a multilayered body may be formed by stacking a ceramic green sheet 104 and an internal electrode pattern 110 on each other, and a seed pattern 140 may then be formed on the surface of the multilayered body. This process is performed based on the modified example of an exemplary embodiment of FIG. 5, and an exemplary embodiment may exclude the forming of the seed pattern 140. Next, as shown in FIG. 8, the reinforcing portion 103 may be formed on a surface of the multilayered body, may include a main component of the ceramic green sheet 104, for example, alumina, which is a ceramic material other than barium titanate, and may include the sintering aid component such as magnesium oxide (MgO). The reinforcing portion 103 may be manufactured in a form of the ceramic green sheet including these components, and may be formed on the surface of the multilayered body by using a negative printing method. Next, as shown in FIG. 9, the ceramic green sheet may be cut in units of capacitors, and FIG. 10 is a cross-sectional view showing its state after the cutting process and the sintering process. Next, as shown in FIG. 11, the plating layers 151 and 152 may be formed to cover the seed layers 141 and 142 and the surface of the body 101 by using a process such as electrolytic plating. In this case, the first and second external electrode 221 or 222 and the reinforcing portion 103 may have the same thickness, based on a height of the capacitor, measured from the first or second surface S1 or S2 of the body 101.

A multilayer capacitor according to another exemplary embodiment of the present disclosure is described with reference to FIGS. 12 through 14. Unlike the multilayer capacitor 100 of an exemplary embodiment having the four-terminal structure described above, this exemplary embodiment shows a multilayer capacitor 200 having a two-terminal structure, which is a so-called bottom electrode structure. The multilayer capacitor 200 having the bottom electrode structure may also be advantageous to have the small thickness, and may have the improved rigidity characteristics and the reduced height-difference by including the reinforcing portion 303. The multilayer capacitor 200 may include the body 101 and first and second external electrodes 321 and 322, and here, the body 101 may include the dielectric layer 102 and first and second internal electrodes 311 and 312 stacked on each other interposing the dielectric layer 102 therebetween. The first and second external electrodes 321 and 322 may each cover the side surface of the body 101, may respectively be connected to the first and second internal electrodes 321 and 322, and may be extended only to the second surface S2 of the first and second surfaces S1 and S2 of the body 101. In this case, the first external electrode 321 may include a seed layer 341 and a plating layer 351 covering the seed layer 341, and similarly, the second external electrode 322 may include a seed layer 342 and a plating layer 352 covering the seed layer 342. The reinforcing portion 303 may include the sintered ceramic body, may be disposed on at least the second surface S2 of the surface of the body 101, not covered by the first or second external electrode 321 or 322, and may be disposed only on the second surface S2 in this exemplary embodiment. A reinforcing portion 303 may be disposed only on the second surface S2 of the body 101, thereby obtaining effects of the improved rigidity characteristics and the reduced height-difference without increasing the thickness of the multilayer capacitor 200. However, in order to further increase these effects, the reinforcement layer 303 may also be disposed on the first surface S1 of the body 101 as shown in another example of FIG. 14.

As set forth above, the multilayer capacitor according to an exemplary embodiment of the present disclosure may have at least one of the improved characteristics such as the rigidity characteristics, the structural stability of the external electrode, etc.

While the exemplary embodiments have been shown and described above, it will be apparent to those skilled in the art that modifications and variations could be made without departing from the scope of the present disclosure as defined by the appended claims.

What is claimed is:
1. A multilayer capacitor comprising:
a body including a dielectric layer and first and second internal electrodes stacked on each other and having the dielectric layer interposed therebetween;
a pair of first external electrodes respectively disposed on first and second corners of the body, which are not adjacent to each other, and connected to the first internal electrode;
a pair of second external electrodes respectively disposed on third and fourth corners of the body, which are not adjacent to each other, and connected to the second internal electrode; and
a reinforcing portion disposed on a surface of the body, not covered by at least one of the first and second external electrodes, and including a sintered ceramic body,
wherein the first and second external electrodes each includes a seed layer disposed on the first to fourth corners of the body.

2. The multilayer capacitor of claim 1, wherein the sintered ceramic body includes a ceramic component other than a ceramic component included in the dielectric layer.

3. The multilayer capacitor of claim 2, wherein the dielectric layer includes a barium-titanate component, and the sintered ceramic body includes an alumina component.

4. The multilayer capacitor of claim 2, wherein a region of the body, in contact with the reinforcing portion, includes the ceramic component included in the sintered ceramic body.

5. The multilayer capacitor of claim 4, wherein the region of the body, in contact with the reinforcing portion, includes a sintering aid component included in the sintered ceramic body.

6. The multilayer capacitor of claim 5, wherein the sintering aid component includes a magnesium oxide (MgO).

7. The multilayer capacitor of claim 5, wherein a region of the reinforcing portion, in contact with the body, includes the ceramic component included in the region of the body, in contact with the reinforcing portion.

8. The multilayer capacitor of claim 1, wherein when a thickness is defined based on a length of the capacitor, measured in a direction in which the first and second internal electrodes are stacked on each other, a thickness t1 and a thickness t2 satisfy a condition of $0 \leq (t1-t2)/t1 < 1/3$, in which t1 indicates a thickness of the first or second external electrode, measured from the surface of the body where the reinforcing portion is positioned, and t2 indicates a thickness of the reinforcing portion.

9. The multilayer capacitor of claim 1, wherein the first and second external electrodes are respectively disposed on first and second surfaces of the body, opposite to each other in a direction in which the first and second internal electrodes are stacked on each other, and extending to partially cover a side surface of the body.

10. The multilayer capacitor of claim 9, wherein the seed layer is disposed on at least one of the first and second surfaces, and the first and second external electrodes each includes a plating layer covering the seed layer.

11. The multilayer capacitor of claim 10, wherein the plating layer covers the first or second surface, and extends to partially cover the side surface of the body.

12. The multilayer capacitor of claim 10, wherein the first and second internal electrodes extend from the side surface of the body, and wherein the side surface of the body is not covered by the seed layer.

13. The multilayer capacitor of claim 1, wherein the body has a square structure based on a direction in which the first and second internal electrodes are stacked on each other.

14. The multilayer capacitor of claim 13, wherein a length of one side of the multilayer capacitor has a value between −10% and +10% of (250+n*350) μm, and here "n" is a natural number.

15. The multilayer capacitor of claim 14, wherein the multilayer capacitor has a thickness of 70 μm or less when the thickness is defined based on its length measured in the direction in which the first and second internal electrodes are stacked on each other.

16. A multilayer capacitor comprising:
a body including a dielectric layer and first and second internal electrodes stacked on each other and having the dielectric layer interposed therebetween;
first and second external electrodes each covering a side surface of the body and respectively connected to the first and second internal electrodes, and extending only to a second surface of the body opposite a first surface of the body based on a direction in which the first and second internal electrodes are stacked on each other, the first and second external electrodes each including a seed layer disposed on only the second surface; and
a reinforcing portion disposed on at least the second surface of the body, not covered by the first or second external electrode, and including a sintered ceramic body.

17. The multilayer capacitor of claim 16, wherein the reinforcing portion is disposed only on the second surface of the body.

18. The multilayer capacitor of claim 16, wherein the reinforcing portion is disposed on both the first and second surfaces of the body.

19. The multilayer capacitor of claim 17, wherein the first surface of the body is exposed.

20. The multilayer capacitor of claim 18, wherein the reinforcing portion overlays an entirety of the first surface of the body based on the direction in which the first and second internal electrodes are stacked on each other.

* * * * *